(12) United States Patent
Lomnitz et al.

(10) Patent No.: US 10,809,372 B2
(45) Date of Patent: Oct. 20, 2020

(54) SYSTEM, DEVICE AND METHODS FOR IMAGING OF OBJECTS USING ELECTROMAGNETIC ARRAY

(71) Applicant: VAYYAR IMAGING LTD, Yehud (IL)

(72) Inventors: Yuval Lomnitz, Herzlia (IL); Damian Hoffman, Zur Yizhak (IL)

(73) Assignee: VAYYAR IMAGING LTD., Yehud (IL)

( * ) Notice: Subject to any disclaimer, the term of this patent is extended or adjusted under 35 U.S.C. 154(b) by 260 days.

(21) Appl. No.: 15/569,480

(22) PCT Filed: May 11, 2016

(86) PCT No.: PCT/IL2016/050503
§ 371 (c)(1),
(2) Date: Oct. 26, 2017

(87) PCT Pub. No.: WO2016/181398
PCT Pub. Date: Nov. 17, 2016

(65) Prior Publication Data
US 2018/0299543 A1     Oct. 18, 2018

Related U.S. Application Data

(60) Provisional application No. 62/159,648, filed on May 11, 2015.

(51) Int. Cl.
*G01S 13/88* (2006.01)
*G01S 13/89* (2006.01)
*G01S 7/02* (2006.01)

(52) U.S. Cl.
CPC ............ *G01S 13/885* (2013.01); *G01S 7/025* (2013.01); *G01S 13/888* (2013.01); *G01S 13/89* (2013.01)

(58) Field of Classification Search
CPC ............................... G01S 13/885; G01S 7/025
(Continued)

(56) References Cited

U.S. PATENT DOCUMENTS 2,735,070 A    2/1956  Riblet
4,010,715 A    3/1977  Robar et al.
(Continued)

FOREIGN PATENT DOCUMENTS

EP    1845364 A2    10/2007

OTHER PUBLICATIONS

D. Pena et al, "Measurement and modeling ofpropagation losses in brick and concrete walls for the 900-MHz band,", IEEE Transactions on Antennas and Propagation, vol. 51, Issue: 1 (2003.
(Continued)

*Primary Examiner* — Marcus E Windrich
(74) *Attorney, Agent, or Firm* — Browdy and Neimark, PLLC

(57) ABSTRACT

The methods and device disclosed herein provide an electromagnetic portable device for imaging an object embedded within a medium, the device including an array including at least two transducers, at least one of transducers for transmitting a signal towards the object, and a transceiver attached to the transducers, the transceiver for transmitting at least one signal toward the object and receiving signals affected by the object while the array is moved in proximity to the medium, a data acquisition unit for receiving and storing the affected signals; and a processor unit for providing one or more hypothetical parameter values over a parameter space of the object and provide a target model per hypothesis of the parameter values, and computing a score value per hypothesis as a function of the target model and the affected signals.

19 Claims, 11 Drawing Sheets

(58) Field of Classification Search
USPC .................................................. 342/22, 179
See application file for complete search history.

(56) References Cited

U.S. PATENT DOCUMENTS

| | | | |
|---|---|---|---|
| 4,211,224 A | 7/1980 | Kubach | |
| 4,211,911 A | 7/1980 | Dehn | |
| 4,626,805 A | 12/1986 | Jones | |
| 5,039,824 A | 8/1991 | Takashima | |
| 5,101,163 A | 3/1992 | Agar | |
| 5,389,735 A | 2/1995 | Bockelman | |
| 5,572,160 A | 11/1996 | Wadell | |
| 5,718,208 A | 2/1998 | Brautigan | |
| 5,774,801 A | 6/1998 | Li et al. | |
| 5,829,522 A | 11/1998 | Ross | |
| 6,006,021 A * | 12/1999 | Tognazzini | G01S 5/0009 342/179 |
| 6,377,201 B1 * | 4/2002 | Chu | G01S 13/0209 342/118 |
| 6,429,802 B1 * | 8/2002 | Roberts | G01V 3/12 342/175 |
| 6,512,475 B1 | 1/2003 | Bogatyrev et al. | |
| 6,636,816 B1 | 10/2003 | Dvorak et al. | |
| 7,034,548 B2 | 4/2006 | Anderson et al. | |
| 7,148,702 B2 | 12/2006 | Wong et al. | |
| 7,387,010 B2 | 6/2008 | Sunshine | |
| 7,448,880 B2 | 11/2008 | Osaka | |
| 7,450,052 B2 * | 11/2008 | Hausner | G01S 7/024 342/188 |
| 7,548,192 B1 * | 6/2009 | Holt | G01S 13/885 342/175 |
| 7,668,046 B2 | 2/2010 | Banker | |
| 7,755,010 B2 | 7/2010 | Godshalk | |
| 7,898,456 B2 * | 3/2011 | Cloutier | G01S 13/32 342/127 |
| 8,050,740 B2 | 11/2011 | Davis | |
| 8,095,204 B2 | 1/2012 | Smith | |
| 8,494,615 B2 | 7/2013 | Melamed et al. | |
| 8,620,238 B2 | 12/2013 | Chan et al. | |
| 8,717,223 B2 * | 5/2014 | Chambers | G01S 13/90 342/191 |
| 8,957,809 B2 * | 2/2015 | Cist | G01S 7/04 342/176 |
| 9,229,102 B1 * | 1/2016 | Wright | G01S 13/888 |
| 2002/0165295 A1 | 11/2002 | Matsumoto | |
| 2003/0146767 A1 | 8/2003 | Steele | |
| 2004/0051790 A1 | 3/2004 | Tamaru et al. | |
| 2004/0077943 A1 | 4/2004 | Meaney | |
| 2004/0190377 A1 | 9/2004 | Lewandowski | |
| 2005/0040832 A1 | 2/2005 | Steele et al. | |
| 2005/0255276 A1 | 11/2005 | Bethune | |
| 2006/0176062 A1 | 8/2006 | Yang et al. | |
| 2006/0220658 A1 | 10/2006 | Okamura | |
| 2008/0296306 A1 | 12/2008 | Handa | |
| 2011/0060215 A1 | 3/2011 | Tupin | |
| 2011/0068807 A1 | 3/2011 | Kesil et al. | |
| 2011/0134001 A1 | 6/2011 | Sakata | |
| 2011/0237939 A1 * | 9/2011 | Melamed | G06T 5/50 600/425 |
| 2012/0242341 A1 | 9/2012 | Olsson | |
| 2013/0082858 A1 * | 4/2013 | Chambers | G01V 3/15 342/22 |
| 2013/0121617 A1 * | 5/2013 | Serrels | G02B 27/58 382/284 |
| 2013/0141287 A1 | 6/2013 | Pallonen | |
| 2013/0231046 A1 | 9/2013 | Pope | |
| 2013/0241780 A1 | 9/2013 | Amm et al. | |
| 2013/0271328 A1 | 10/2013 | Nickel | |
| 2013/0300573 A1 | 11/2013 | Brown | |
| 2013/0329139 A1 | 12/2013 | Feher | |
| 2014/0066757 A1 | 3/2014 | Naftali | |
| 2014/0179239 A1 | 6/2014 | Nickel | |
| 2015/0049170 A1 | 2/2015 | Kapadia et al. | |
| 2016/0336643 A1 | 11/2016 | Pascolini | |

OTHER PUBLICATIONS

G. Roqueta et al., "Analysis of the Electromagnetic Signature of Reinforced Concrete Structures for Nondestructive Evaluation of Corrosion Damage," IEEE Transactions on Instnumentation and Measurement, vol. 61, Issue: 4 (2012).

Xian-Qi He et al., "Review of GPR Rebar Detection", PIERS Proceedings, Beijing, China, Mar. 23-27, 2009.

C. Stolte et al., "Eccentricity-migration: A method to improve the imaging of pipes in radar reflection data", Fifth International Conference on Ground Penetrating Radar, Expanded Abstracts, Proceedings, Ontario, Canada, 723-733, (1994)).

Kruk Jan Van Der, "Three dimensional imaging of multi-component ground penetrating radar data" (Phd dissertation) (2001).

R. Streich et al., "Accurate imaging of multicomponent GPR data based on exact radiation patterns," IEEE Transactions on Geoscience and Remote Sensing, vol. 45, 93-103 (2007).

Crocco L et al: "Early-stage leaking 1-13 pipes GPR monitoring via microwave A tomographic inversion" Journal of Applied Geophysics. Elsevier. Amsterdam. NL. vol. 67. No. 4. Apr. 1, 2009 (Apr. 1, 2009). pp. 270-277. XP026033856.

Ayliffe et al., 'Electric Impedance Spectroscopy Using Microchannels with Integrated Metal Electrodes' IEEE Journal of Microelectromechanical Systems, vol. 8, No. 1, Mar. 1999.

P. Lombardini et al., "Criteria for the Design of Loop-Type 12 Directional Couplers for the L Band" (1956).

Pallavi R. Malamel et al., "Microwave Reflectometry Based Electrical Characterization of Milk for Adulteration Detection", Advance in Electronic and Electric Engineering, ISSN 2231-1297, vol. 4, No. 5 (2014), pp. 487-492.

Valerie Favry, "Design and Development of a Novel Electronic Sensor for Detecting Mastitis Based on Conductance/Impedance Measurements", Thesis submitted for the Degree o f Master o f Science,Supervised by Prof. Dermot Diamond School o f Chemical Sciences, National centre for Sensor Research Jul. 2004.

* cited by examiner

SYSTEM, DEVICE AND METHODS FOR IMAGING OF OBJECTS USING ELECTROMAGNETIC ARRAY

CROSS-REFERENCE

The present application claims the benefit of U.S. Provisional Application Ser. No. 62/159,648, filed on May 11, 2015, entitled "SYSTEM, DEVICE AND METHOD FOR IMAGING OF OBJECTS USING ELECTROMAGNETIC MODELING", the entire disclosures of which are incorporated herein by reference. The subject matter of the present application is related to PCT Application PCT/IL2015/050126, filed Feb. 4, 2015, entitled "SYSTEM DEVISE AND METHOD FORTESTING AN OBJECT", PCT Application PCT/IL2015/050099, filed on Jan. 28, 2015, entitled "SENSORS FOR A PORTABLE DEVICE", U.S. application Ser. No. 14/605,084, filed on Jan. 26, 2015 entitled "VECTOR NETWORK ANALYZER" U.S. application Ser. No. 14/499,505, filed on Sep. 30, 2015 entitled "DEVICE AND METHOD FOR CALIBRATING ANTENNA ARRAY SYSTEMS" each of which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The present invention relates to a system, device and method for imaging an object or substances and more specifically, but not exclusively, to RF (Radio Frequency) imaging and estimation of elongated objects using approximate electromagnetic modelling.

BACKGROUND

Prior to the background of the invention being set forth, it may be helpful to set forth definitions of certain terms that will be used hereinafter.

The term Ground Penetrating Radar (GPR) as used herein is defined as a geophysical method that uses radar pulses to image the subsurface of an object. This nondestructive method uses electromagnetic radiation in the microwave band (UHF/VHF frequencies) of the radio spectrum, and detects the reflected signals from subsurface structures.

One of the challenges of imaging subsurface elements such as in GPR methods and in-wall imaging methods, is imaging elongated objects, such as rebars, pipes, wires and so on (hereinafter "pipes").

The standard radar imaging algorithms (such as delay and sum (DAS), also known as Kirchhoff migration) back propagate the signals according to the delay representing each point in space, which results in sub-optimal and distorted view of the object. The reason for such distorted view of the object is that for each antenna pair, the main reflection from the pipe arrives from a different point on the pipe, and therefore coherent summation is obtained only for a discrete set of points along the pipe and for a partial set of the pairs/antennas at each point.

The literature on imaging of pipes and rebars, for example by Pena, D.; Feick, R; Hristov, H. D.; Grote, W., entitled "Measurement and modeling of propagation losses in brick and concrete walls for the 900-MHz band,", IEEE Transactions on Antennas and Propagation, Volume: 51, Issue: 1, 2003) is concerned with the single bistatic reflection properties mainly influenced by the propagation in the relevant media (e.g. concrete).

An article by Roqueta, G.; Jofre, L.; Feng, M. Q, entitled "Analysis of the Electromagnetic Signature of Reinforced Concrete Structures for Nondestructive Evaluation of Corrosion Damage," IEEE Transactions on Instrumentation and Measurement, Volume: 61, Issue: 4, 2012) demonstrated via FDTD (finite elements) simulations how the reflection from a rebar changes with corrosion.

A detailed review on imaging of rebars is illustrated by Xian-Qi He, Zi-Qiang Zhu, Qun-Yi Liu, and Guang-Yin Lu, entitled "Review of GPR Rebar Detection,", PIERS Proceedings, Beijing, China, Mar. 23-27, 2009. Specifically Xian-Qi He discuss several methods for estimation of the rebar (or pipe) radius. These methods either use the delay-versus-location relation of all signals recorded in SAR survey (i.e. identify the radius as a constant shift of delays of all signals with respect to the correct target center), or use the relation between the amplitudes in two polarizations.

Stoke, C. and K. Nick, discusses on an article entitled "Eccentricity-migration: A method to improve the imaging of pipes in radar reflection data," Fifth International Conference on Ground Penetrating Radar, Expanded Abstracts, Proceedings, Ontario, Canada, 723-733, improvement of imaging for pipes, using an improved back-migration of the signals, indirectly taking into account the pipe's radius effect on the delay "hyperbolas".

Jan van der Kruk 2001 discusses on an article entitled "Three dimensional imaging of multi-component ground penetrating radar data" (Phd dissertation) (see also Streich, R. and J. van der Kruk, "Accurate imaging of multicomponent GPR data based on exact radiation patterns," IEEE Transactions on Geoscience and Remote Sensing, Vol. 45, 93-103, 2007), 3D imaging using accurate EM modelling (including the antennas, and near-field electromagnetic modelling). Multi-component imaging implies that several (polarization) components of the transmitted/received E field are used. The essence of the Multi-component imaging algorithm is to replace the back-scattering operator (e.g. as used in Kirchhoff migration) by a matrix operation describing the propagation of the field components. It does not assume an antenna array but rather a set of mono-static measurements, where a single antenna-pair is moved to different locations along a line. The author mentions (page 9) that the usual back-propagation may not be suitable for pipes laid diagonally with respect to the survey line, but still uses this propagation for imaging and does not suggest an alternative.

As discussed above, various devices and methods of the prior art use GPR or DAS methods for sensing subsurface elements such sensing objects or elements covered or surrounded in a medium.

The data provided by prior imaging devices of hidden target objects is poor and can be less than ideal in at least some instances. For example, although prior sensing devices such as radar sensing devices can provide a general data of the location of hidden objects the data may be of little significance to at least some users as it doesn't include an accurate image and location of the hidden targets. It would be helpful if specific data of hidden targets could include a 'real' image of the hidden target in real-time. For example, it would be helpful if an imaging device may be used to uncover and image the exact location, size, orientation of a hidden embedded object (e.g. target) in a medium. Many other examples exist where radar devices do not adequately convey relevant parameters of an object covered, embedded or surrounded by a medium, and it would be helpful to provide an accurate image of the object to a user.

In light of the above, an improved imaging device that overcomes at least some of the above mentioned deficiencies of the prior devices would be beneficial. Ideally such an imaging device would be a compact, integrated with a consumer device such as a cellular telephone, sufficiently rugged and low in cost to be practical for end-user measurements of well-hidden items, convenient to use.

SUMMARY OF THE INVENTION

Prior to the summary of the invention being set forth, it may be helpful to set forth definitions of certain terms that will be used hereinafter.

The term 'hypothesis testing' as used herein is defined as the logical process (implemented in software or hardware media) for scanning multiple options (hypotheses), and evaluating the likelihood or fitness of each option to a given set of data.

The term 'target' or 'target object' or 'object' as used herein is defined as an object located or embedded within (e.g. hidden) an object or medium such as an opaque object made of wood.

The terms 'modeling' or 'electromagnetic modeling' or '3D modeling' as used herein is defined as a process of representation or visualization of an external and internal parts and parameters (e.g. width, volume etc.) of an object embedded within a medium (e.g. targets which are inside the object).

The term 'parameter' as used herein with reference to the target or object is define d as a value such as a numerical value associated with the target or object, for example, the parameters associated with a pipe may be: location, orientation, radius, dielectric constant, etc. Different objects may have a different set of parameters.

The term 'parameter space' as used herein is defined as a set of some or all parameters associated with the target (object), together with their assumed ranges (for example, depth between 1 cm and 10 cm and radius between 0 cm and 2 cm).

Embodiments of the present invention provides an improved imaging device which could see through a medium or object(s) such as solid objects for example a wall made of wood or plaster wall and may uncover and display to a user an accurate image of one or more targets (e.g. target objects) such as water pipes, electric wires etc. which are embedded and hidden behind the objects. The imaging device is a low-cost, rugged device suitable for combination with consumer devices and cloud computing.

In an exemplary embodiments the target object may be thin elongated objects and methods and device of the invention may include an image of the elongated objects and the orientation of the thin elongated element (including for example, elements which are smaller in diameter than the wavelength, and therefore polarizing) in respect to the imaging device of the object surrounding the elongated objects.

According to a first aspect of the invention there is provided a RF (Radio Frequency) device, the device comprising: an array, the array comprises at least two transducers, wherein at least one of said at least two transducers is configured to transmit a signal towards at least one object embedded in a medium, and at least one transceiver attached to said at least two transducers, the at least one transceiver is configured to transmit at least one signal toward the at least one object and receive a plurality of signals affected by the object while the array is moved in proximity to the medium; a data acquisition unit configured to receive and store said plurality of affected signals; and at least one processor unit, said at least one processor unit is configured to: provide one or more hypothetical parameter values over a parameter space of said at least one object; and provide a target model per hypothesis of said parameter values, and compute a score value per hypothesis as a function of the target model and the affected signals.

In an embodiment, the score value are processed by said at least one processing unit to provide an image of said target object.

In an embodiment, the device further comprising a display unit for displaying the image of said at least one object.

In an embodiment, the image comprises an image of a portion of said at least one object, said portion is located in proximity to the device or the array.

In an embodiment, the image comprises an image of a portion of said at least one object, said portion is located less than 100 cm or less than 50 cm from the array or the device.

In an embodiment, the image comprises an image of a portion of said at least one object, said portion is located in front of the device or the array in parallel or perpendicular to the device or the array.

In an embodiment, the image is a 2D (two dimensional) or 3D (there dimensional).

In an embodiment, the parameter space comprises one or more parameters selected from the group consisting of depth, distance from a reference point, orientation, radius, location point (X,Y, Z) in a X-, Y-, Z-axis Cartesian coordinate system, dielectric constant.

In an embodiment, the at least one of said object shape is selected from the group consisting of an elongated object, a plane layer, a single point.

In an embodiment, the elongated object is a pipe, rebar or wire.

In an embodiment, the at least one object or the medium are made of plaster, stone, concrete, gypsum, iron, plastic wood, glass, plastic, gypsum, aluminum iron, stone, air, or combinations thereof.

In an embodiment, the device is configured to be in communication with a mobile device comprising a processor and wireless communication circuitry to couple to the device, the processor comprising instructions to receive data on said at least one object and display the image of said at least one object.

In an embodiment, the mobile device is a mobile communication device.

In an embodiment, the at least one processor unit and said display are located in said mobile device.

In an embodiment, the target model consists of a plurality of delays of transducers pairs of the at least two transducers of said array.

In an embodiment, the target model consists of a plurality of amplitudes of transducers pairs of the at least two transducers of said array.

In an embodiment, the processing unit is configured to: compute a signaled value of an the estimated reflection from each point in space in an area of said at least one object; sum signed images along an hypothesized trajectory of the at least one object for one or more of said at least one object directions; and select the at least one object trajectories with maximum absolute sum.

In an embodiment, the sum is normalized by a function of the overall length of the at least one object.

In an embodiment, the processing unit is configured to: generate at least two or three images, representing reflections of RF signals affected by the at least one object depending on combinations of different polarizations; combine the at least two or three images.

In an embodiment, the processing unit is configured to compute the direction and polarization of said at least one object based on said at least two or three images.

In an embodiment, the at least two or three images are denoted as $I_{xx}$, $I_{yy}$, $I_{xy}$ and are combined using one of the following metrics:

$$I_1 = \text{sign}(I_{xx} + I_{yy}) \cdot \frac{1}{4}\{|I_{xx} + I_{yy}| + |(I_{xx} - I_{yy}) + j(I_{xy} + I_{yx})|\}$$

$$I_2 = \log(J_0(j \cdot c_{S/C} \cdot |(I_{xx} - I_{yy}) + j(I_{xy} + I_{yx})|)) + c_{S/C}(I_{xx} + I_{yy})$$

$$I_3 = (I_{xx} + I_{yy})^2 + \frac{1}{2}(I_{xx} - I_{yy})^2 + \frac{1}{2}(I_{xy} + I_{yx})^2$$

$$I_4 = \max(|I_{xx}|, |I_{yy}|)$$

Where $J_0$ is the Bessel-J function, $j=\sqrt{-1}$, $c_{S/C}$ is a constant and $I_{yx}=I_{xy}$,
and wherein if two images of said at least two images are computed, a third image of the at least two images in the metrics above is set to 0.

In an embodiment, the direction and polarization of said at least one object is based on said at least two images and is computed according to the following equation:

$$\hat{\theta} = \frac{1}{2} \cdot \text{angle}\{((I_{xx} - I_{yy}) + j(I_{xy} + I_{yx})) \cdot (I_{xx} + I_{yy})\}$$

where $I_{yx}=I_{xy}$, and $j=\sqrt{-1}$.

In an embodiment, the processing unit is configured to measure said pipe radius, said estimation comprises: obtaining an estimate of the affected signals in one or more directions parallel and perpendicular to the pipe; computing the time delay or amplitude ratio between at least two reflections of said reflections; and selecting a best fit of the measurements with simulated/modelled results of the time delay.

In an embodiment, the image is constructed according to a strength level at each point in space of said at least one object.

In an embodiment, the image is constructed according to a rendered graphical model of said at least one object, said rendered graphical model comprising the highest scores, above a threshold.

In an embodiment, the transducers are antennas.

In an embodiment, the array is a Radio Frequency (RF) array and the at least two transducers are RF antennas configured to transmit an RF signal.

In an embodiment, the plurality of signals are radio frequency (RF) signals.

In an embodiment, the plurality signals are selected from the group comprising of pulses signals, stepped/swept frequency signals.

In an embodiment, the plurality of signals bandwidth is within the UWB (3-10 Ghz) range or signals in the range between 1 Ghz and 100 Ghz.

According to a second aspect of the invention there is provided a method for imaging an object embedded within a medium, the method comprising: obtaining by a (Radio Frequency) RF array a plurality of RF signals affected by said object or said medium, wherein said RF array comprising at least two transducers; measuring said affected signals by a Radio Frequency Signals Measurement Unit (RFSMU) to yield a measurement data of said object; hypothetically scanning one or more parameter spaces of said object by at least one processing unit; simulating by said at least one processing unit for each of said scanned parameter spaces a plurality of delays of transducers pairs of the at least two transducers of said array and weight a score value for each of said parameters; comparing said measurement data to said score value to yield said object parameters; and constructing an image of said object.

In an embodiment, the image is a 2D image or a 3D image.

According to a third aspect of the invention there is provided an electromagnetic (EM) portable device for imaging an object embedded within a medium, the device comprising: a portable housing configured to be carried by a user; and a sensing unit located within said housing said sensing unit is configured to sense through said medium and obtain EM data of said object; at least one processing unit which is in communication with said sensing unit, said processing unit is configured to receive said EM data and process said data to provide at least one parameter of said object and process said at least one parameter to provide a rendered graphical visualization of said object.

In an embodiment, the portable housing comprises a display unit for displaying said rendered graphical visualization.

In an embodiment, the object is an elongated object.

In an embodiment, the elongated object is a pipe or a wire or a rebar.

In an embodiment, the displayed image comprises a visualization of the elongated object according to the said at least one parameter.

In an embodiment, the at least parameter is selected from the group consisting of depth, distance from a reference point, orientation, radius, location point (X,Y, Z) in a X-, Y-, Z-axis Cartesian coordinate system, dielectric constant.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION OF THE INVENTION

Figure 1:
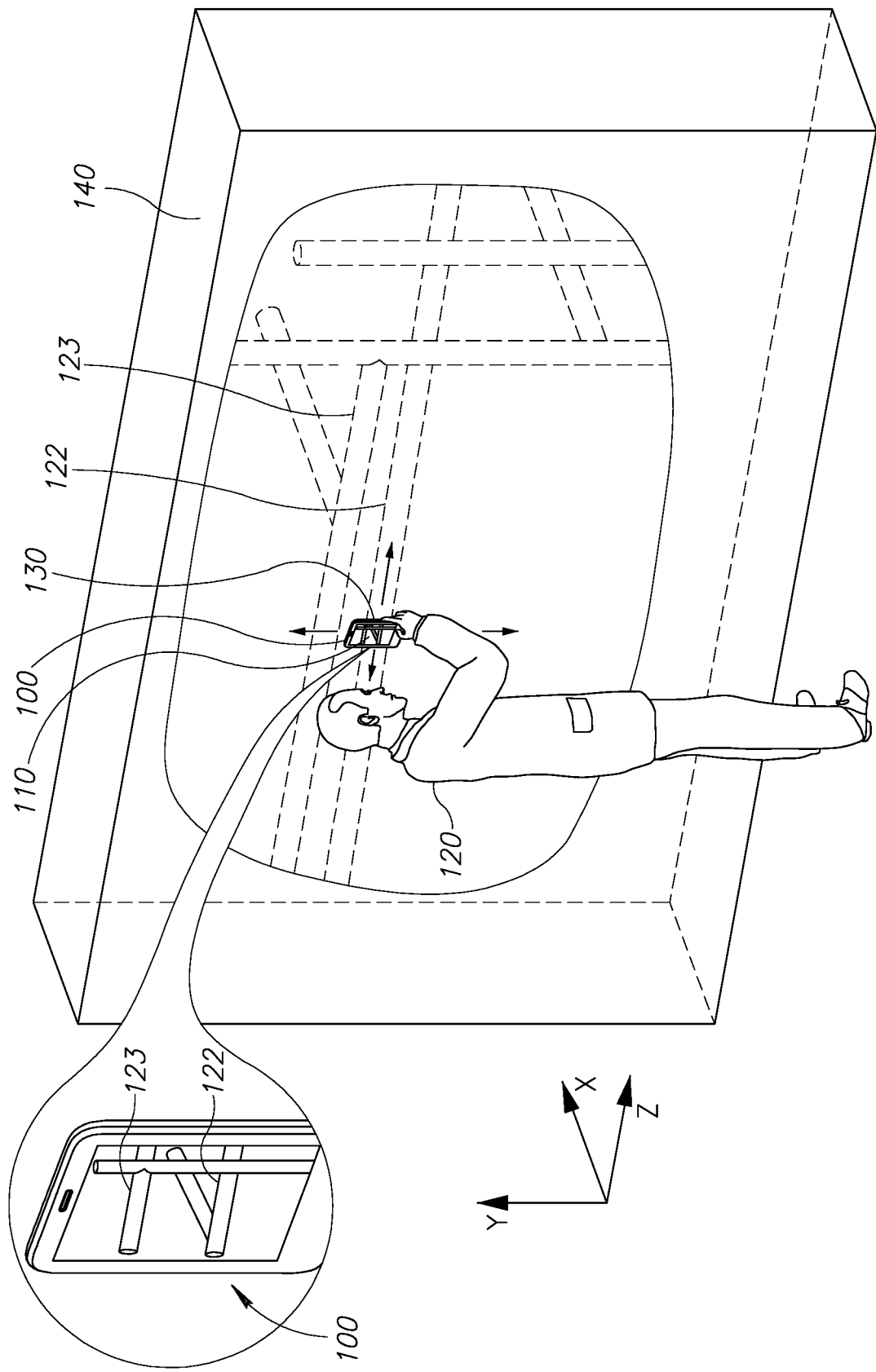
FIG. 1 is a simplified schematic diagram illustrating a user scanning the surface of an object such as a wall by a mobile device, according to an embodiment of the invention.

The present invention relates to a system, device and methods for imaging an object or substances specifically, but not exclusively, to an electromagnetic (e.g. RF) imaging and estimation of one or more target objects such as elongated objects which are embedded, hidden in or surrounded by a medium or materials using electromagnetic modelling (e.g. RF imaging).

More specifically, the present invention provides methods and a device for imaging (e.g. 2D imaging or 3D imaging) of one or more target objects (e.g. hidden targets such as pipe or a miniaturized element) covered or surrounded by a medium or object (e.g. solid objects such as a wall). The device comprises an RF sensor configured to transmit and receive RF signals which penetrate through one or more objects (e.g. different types of objects), one or more processing units configured to receive multiple RF signals affected or reflected from the target objects and/or the medium or elements surrounding the target objects and process the multiple RF signals to provide an image of the hidden objects. The visualization may be or may include a graphical visualization (e.g. rendered graphical visualization). For example the graphical visualization may be include an image such as a 3D image of the hidden targets comprising one or more of the target's parameters such as size, width volume etc.

In an embodiment, the image may include an improved image quality of the hidden object such as elongated objects or elements such as pipes, wires, etc., with an increased probability of detection of such elements, and ability to estimate their parameters (e.g. orientation, radius).

According to one embodiment of the invention, there is provided a device comprising a MIMO (multiple input multiple output) sensing unit for imaging a target objects embedded within a medium such as homogenous or non homogenous or layered media. In an embodiment the sensing unit may include an antenna array comprising a plurality of antennas/sensors, the antennas/sensors are configured to produce a set of active measurements.

In an embodiment the device comprises an array, the array comprises at least two transducers, wherein at least one of said at least two transducers is configured to transmit a signal towards at least one object embedded in a medium, and at least one transceiver attached to said at least two transducers, the at least one transceiver is configured to transmit at least one signal toward the at least one object and receive a plurality of signals affected by the object while the array is moved in proximity to the medium.

According to some embodiments of the invention, the imaging methods comprise using coherent summation of the signals (received at the sensing unit) affected by the object and/or the targets (e.g. pipe) and considering the delays obtained via a geometrical ray tracing model. For each point in space and/or for each orientation of the target objects, the delays, and potentially amplitudes, from all or almost all the array's antennas are computed. Then, the received signals (e.g. affected signals) are shifted (back-propagated) using these delays. Using the same received signals, the target's orientation and radius may be obtained as will be discussed in greater detail below.

In some embodiments the target may be or may include one or more point of targets, pipes, wires or a plurality of layers or mirrors or surfaces.

In an embodiment, for scenarios where polarimetric measurements are available, for example when cross-polarized antennas are used, or when the array includes antennas of more than one polarization, the polarimetric measurements may be utilized for estimation of pipe's orientation and radius.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3A:
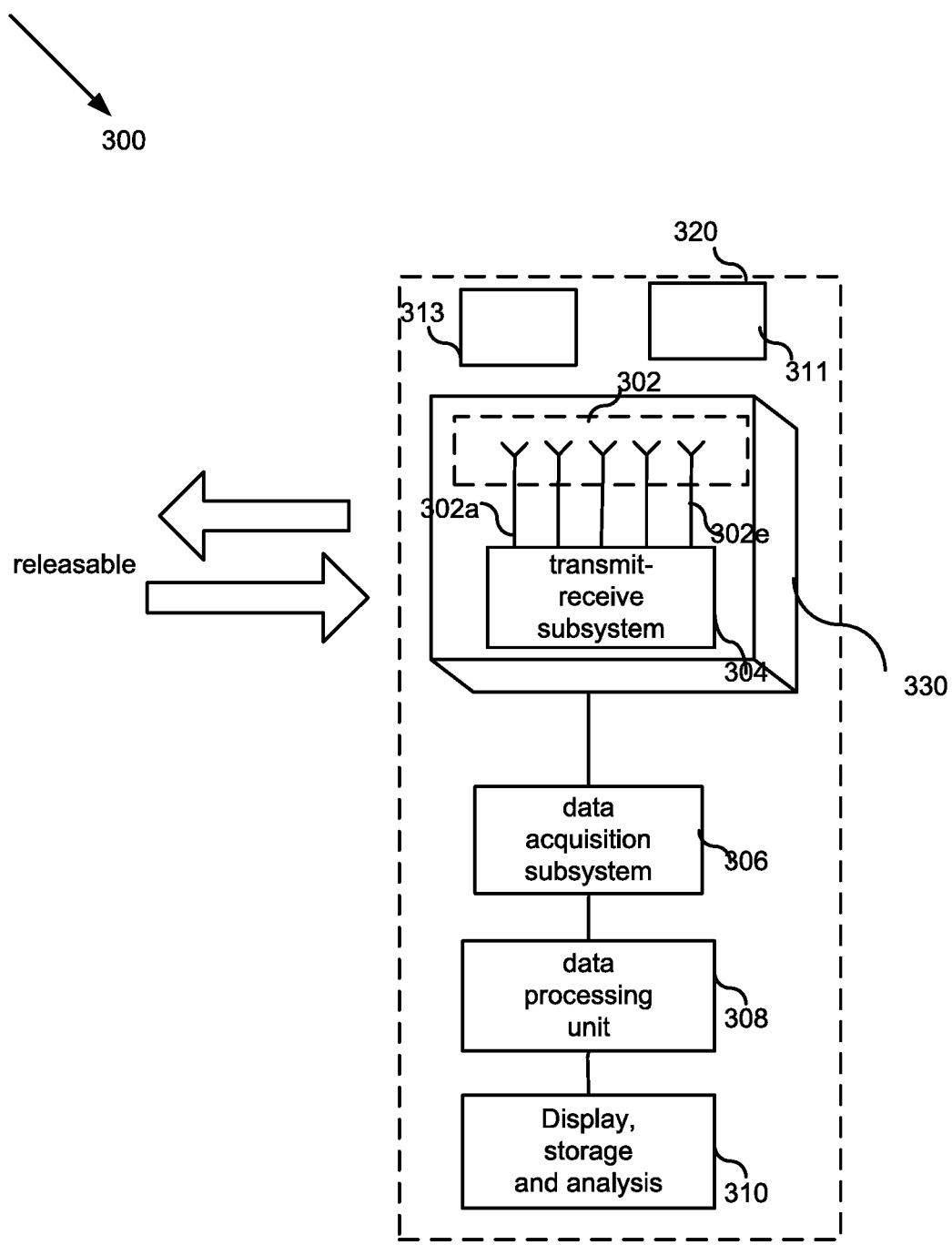
FIG. 3A is a schematic view of a sensing device, in accordance with embodiments of the invention.

Referring now to the drawings, FIG. 1 is a simplified schematic diagram showing a user 120 scanning the surface of a medium such as a wall 140 by a mobile device 100. The medium may be made of for example a solid element such as wood, stone, gypsum, concrete or non solid elements such as air, water, or a combination thereof. The mobile device 100 may be for example a communication mobile device such as a mobile phone for example a smartphone or a tablet as will be illustrated specifically in FIG. 3A. In operation, the user 120 places the device 100 in proximity to the wall for example in parallel to the wall (e.g. in front of the wall, few cm from the surface of the wall for example between 1-100 cm from the wall, or less). Once the user 120 scans the wall, one or more hidden targets (objects) such as vertical rebars 122 and 123 embedded within the wall in front or in proximity to the device may be imaged and displayed to the user in real time (or off line), for example on the display unit 110 unit. In some cases the image may include a 3D image of the targets including specific information of the target's parameters such as size, orientation, radius depth, and distance from the object or the imaging device. In some cases a complete image of the wall 140 and the internal objects embedded in the wall 140 may be identified and imaged.

In some cases the image may be or may include a visualization such as a graphical visualization or a rendered graphical visualization of the object including the object's parameters such as size, orientation, distance from the medium etc.

In some cases the device 100 may include a sensing unit 130 (e.g. measurement unit) which may be in communication or attached to a processing unit and/or a display unit. For example the user 120 may scan the surface of the wall by the sensing unit 130 and the scanned data may be transmitted via wire or wireless connection to a database unit located for example on a cloud and the scanned data may be processed by one or more external processing units.

In some cases the scanned date (e.g. graphic visualization, parameters, or an image of the object) may be displayed to the user on headset (goggles) such as a VR (Virtual Reality) and/or AR (Augmented Reality) headset or on the mobile device such as smartphone.

Figure 2:
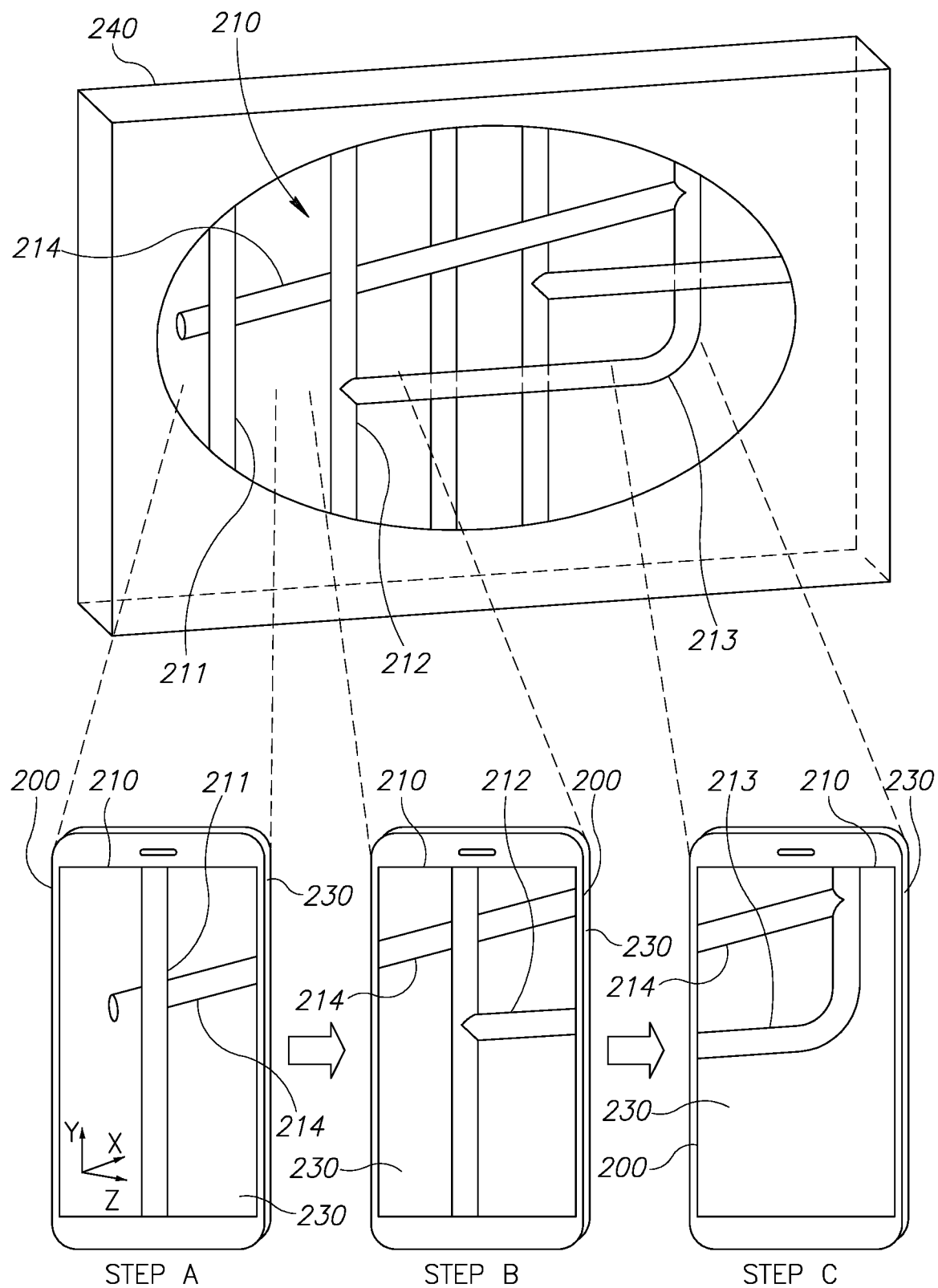
FIG. 2 is a simplified schematic diagram illustrating specifically a process for imaging one or more objects covered and hidden within a medium such as a wall, according to an embodiment of the invention.

FIG. 2 is a simplified schematic diagram illustrating specifically a process for imaging one or more target objects covered, embedded and hidden in a medium such as a wall, in accordance with embodiments of the invention. The target objects may be for example pipes such as elongated water pipes 211, 212 and 213 or electric wires 214 embedded within a medium such as wall 240. The wall 240 may be made of wood, glass, plastic, gypsum, aluminum, iron, stone, or any combinations thereof. The user may place a mobile device 200 comprising the sensing unit and the display unit and the target objects hidden in the wall may be uncovered and displayed on the display while the user scans the external surface of the wall. In some cases the medium may be a multilayer medium for example a wall including more than two layers made of different types of materials. For example the first layer may be made of plaster or wood and the second layer may be made of a second type of material may such as plastic. The images displayed to the user may be 2D or 3D images presenting the exact size and orientation of the hidden target objects. Specifically the images include the portion of the target which is in proximity to the mobile device or the sensing unit. For example, as shown in FIG. 2 at step A the mobile device displays on a display 230 a portion 211 including the perpendicular section of a pipe 210 located at the left side of the wall and a portion of wire 214 and as the user scans the wall from left to right other portions of the pipe 210 are uncovered and displayed such as at step B portion 212 including the horizontal portion of the pipe is displayed and another portion of wire 214, and at step C the curve section 213 is uncovered and displayed to the user.

Figure 3B:
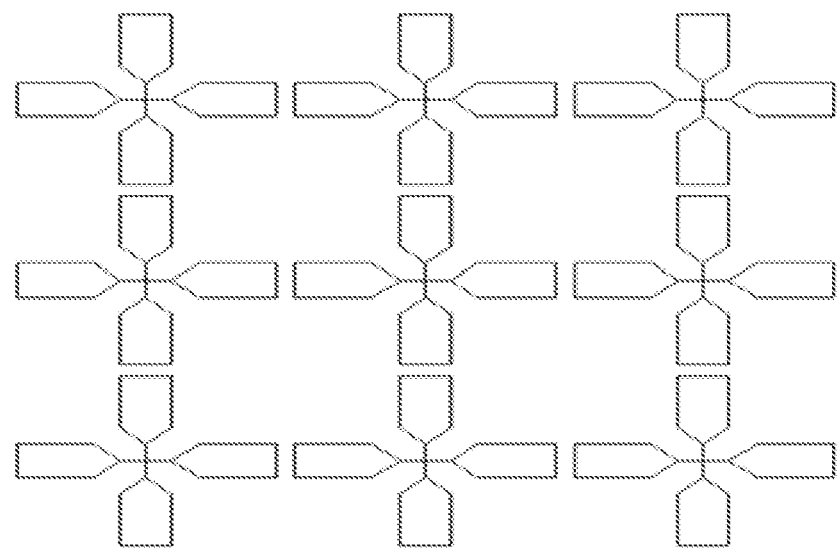
FIG. 3B is a schematic view of an antenna array, in accordance with embodiments of the invention.

Referring now to the drawings, FIG. 3 illustrates an imaging system 300 configured to sense or image a one or more targets (target objects) embedded within an object or medium, in accordance with embodiments of the invention. The system 300 comprises a measurement unit 330 configured to be attached or included in a device such as a portable device 320. According to some embodiments, the portable device 320 may be a handheld device or a handheld computer such as a mobile telephone, a smart phone, a tablet computing device, a laptop computing device, a personal digital assistant, a visible light camera, a personal video device or a music player, personal media player, global positioning system navigational device, pager, portable gaming device or any other appropriate mobile device known in the art. For example, the measurement unit 330 may be configured to capture, characterize, image, sense, process, and/or identify, or define a target (e.g. target objects) embedded within the medium such as OUT (object under test) and provide an identification results relating to the OUT to the portable device 320 for use in any desired fashion (e.g., for further processing, to store in memory, to display, to use by various applications running on the portable device 320, to export to other devices, or other uses).

In one embodiment, the sensor unit 330 may be a multi-layer structure implemented at least in part with printed circuit board techniques using appropriate dielectric materials. Commonly used materials are glass-epoxy, Teflon-based materials. Layers of high-dielectric-constant materials can be incorporated in order to match the antennas to materials under test.

The measurement unit 330 may include or may be connected to a transmit/receive subsystem 304, a data acquisition subsystem 306, a data processing unit 308, additional sensors such as accelerometer 311 and imager 313 and a console 310.

According to some embodiments of the invention the measurement unit comprises an array, the array comprises one or more transducers (e.g. antennas), wherein at least one of said at least two transducers is configured to transmit a signal towards a medium or objects, and at least one transceiver attached to the transducers, the at least one transceiver is configured to transmit at least one signal toward the medium and receive a plurality of signals affected by the medium.

Specifically, the measurement unit 330 may include one or more antennas such as antenna array 302. For example the antenna array 302 may include multiple antennas 302a-302e typically between a few and several dozen (for example 30) antennas. The antennas can be of many types known in the art, such as printed antennas, waveguide antennas, dipole antennas or "Vivaldi" broadband antennas. The antenna array can be linear or two-dimensional, flat or conformal to the region of interest.

According to some embodiment of the invention the antenna array 302 may be an array of flat broadband antennae, for example spiral shaped antennae. The antenna array 302 may include a layer of matching material for improved coupling of the antenna radiation to the materials or objects under test. The unique and optimized shape of the antenna array, enables their use in limited sized mobile devices, such as a thin, small-sized smart phone or tablet. In addition, the use of an antenna array made as flat as possible, for example in a printed circuit, allows for the linkage of the measurement unit 330 to any mobile device known in the art, as it does not take up much space in the mobile device, it is not cumbersome, nor does it add significant weight to the portable device 320.

In some cases the measurement unit 330 may be a standalone unit, for example attached to or connected to a computer device via wire or wireless connections such as USB connection or Bluetooth™ or any electronic connection as known in the art.

The transmit/receive subsystem 304 is responsible for generation of the microwave signals, coupling them to the antennas 302a-302e, reception of the microwave signals from the antennas and converting them into a form suitable for acquisition. The signals (e. g. RF signals) can be pulse signals, stepped-frequency signals, chirp signals and the like. The generation circuitry can involve oscillators, synthesizers, mixers, or it can be based on pulse oriented circuits such as logic gates or step-recovery diodes. For example these signals may be microwave signals in the UWB band 3-10 Ghz (having a wavelength of 3-10 cm in air). The conversion process can include down conversion, sampling, and the like. The conversion process typically includes averaging in the form of low-pass filtering, to improve the signal-to-noise ratios and to allow for lower sampling rates. The transmit/receive subsystem 104 can perform transmission and reception with multiple antennas at a time or select one transmit and one receive antenna at a time, according to a tradeoff between complexity and acquisition time.

In some embodiments, the sensing system may include MIMO (multiple-input and multiple-output) arrays in the microwave region.

The data acquisition subsystem 306 collects and digitizes the signals from the transmit/receive subsystem 304 while tagging the signals according to the antenna combination used and the time at which the signals were collected. The data acquisition subsystem will typically include analog-to-digital (A/D) converters and data buffers, but it may include additional functions such as signal averaging, correlation of waveforms with templates or converting signals between frequency and time domain.

The data acquisition subsystem 306 may include a Radio Frequency Signals Measurement Unit (RFSMU) such as a Vector Network Analyzer (VNA) for measuring the received/reflected signals.

The data processing unit 308 is responsible for converting the collected signals into a set of responses characterizing the target objects, and performing the algorithms for converting the sets of responses, for example into medium sensing data.

An example of algorithm for converting the sets of responses may be for example Delay and Sum (DAS) algorithm.

According to some embodiments, the system may include an accelerometer 311 to fine tune and give additional data in respect to the movement, the distance of the device.

Additionally, the device may include an imager 313 to obtain the device relative location or movement in respect to a reference location, as will be illustrated in details hereinabove.

A final step in the process is making use of the resulting parameters or image, either in the form of visualization, display, storage, archiving, or input to feature detection algorithms. This step is exemplified in FIG. 3 as console 310. The console for example in a mobile device is typically implemented as a handheld computer such as a mobile telephone or a table computer with appropriate application software.

According to system type, the computer can be stationary, laptop, tablet, palm or industrial ruggedized. It should be understood that while FIG. 3 illustrates functional decomposition into processing stages, some of those can be implemented on the same hardware (such as a common processing unit) or distributed over multiple (such as graphical processing unit, GPU) and even remote pieces of hardware (such as in the case of multiprocessing or cloud computing).

According to one embodiment of the invention, subsystems 306, 308 and 310 may be part of the measurement unit or the portable device 320, as shown in FIG. 3. Alternatively the measurement unit 330 may be included within a housing 325 such as case or a jacket configured to be releasable (i.e. connected or disconnected) to the portable device 320. For example the measurement unit 330 may include the antenna array unit 302 and the transmit/receive-subsystem 330 may be part of the housing 325 which is electrically or wirelessly connected to the portable device 320, for example through a dedicated connection such a USB connection, wireless connection or any connection known in the art.

Following the connection of the sensor unit 330 to the portable device, the sensor unit 330 may utilize the portable device's own data acquisition, data processing display, storage and analysis subsystems.

Imaging and Hypothesis Testing

Figure 4:
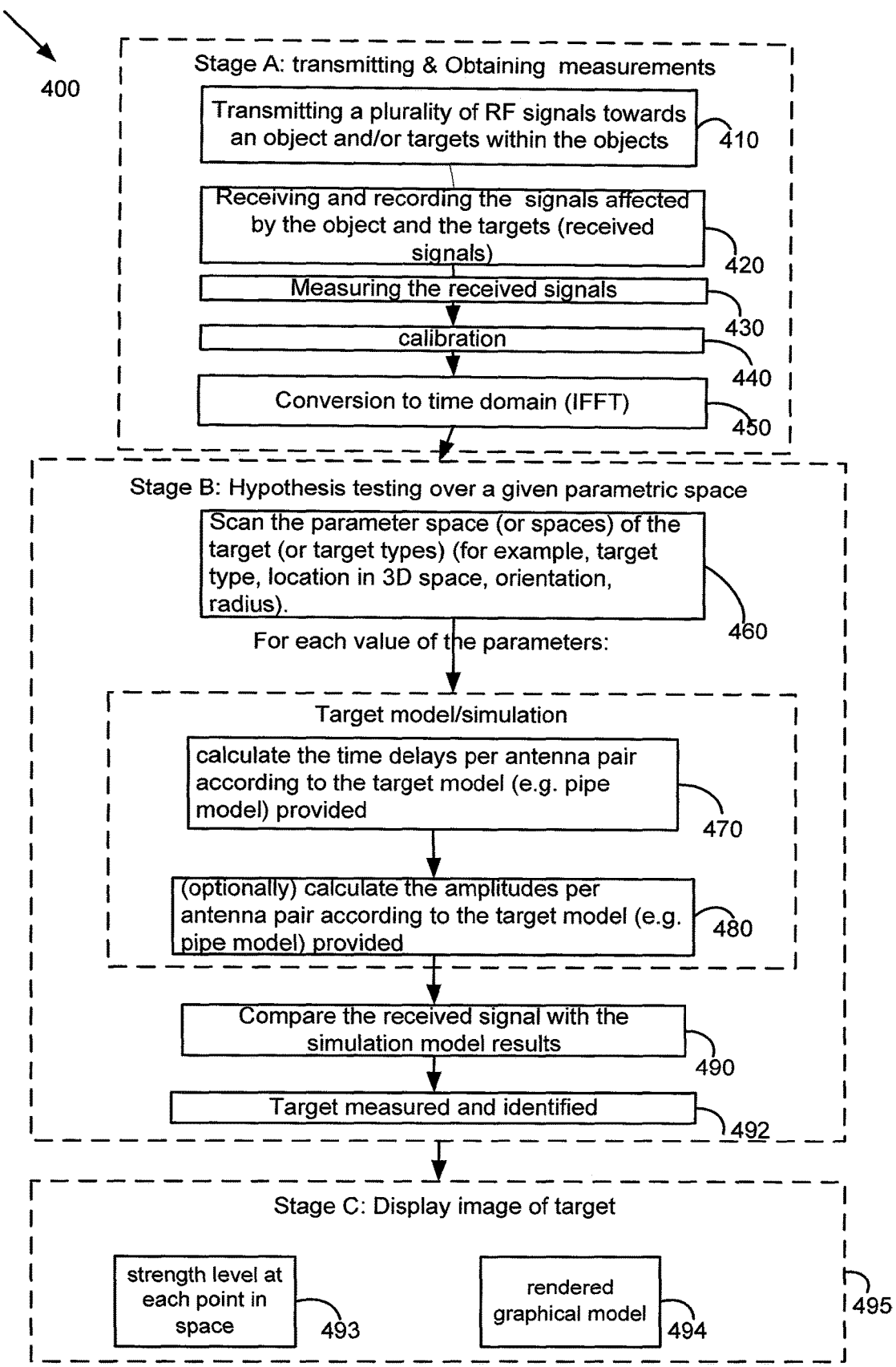
FIG. 4 is a flowchart illustrating a method for imaging one or more targets located in an object, in accordance with embodiments of the invention.

FIG. 4 is a flowchart 400 illustrating a method for imaging one or more objects (e.g. target objects) located or embedded within a medium, for example the object may be covered or surrounded by an opaque rigid object or a medium. According to one embodiment of the invention, an image (e.g. 3D image) of the object is provided by coherent summation of signals reflected from the object and the medium and by measuring the delays obtained via a geometrical ray tracing model. For each point in space, and potentially for each orientation of the object (e.g. pipe) the delays, and potentially amplitudes, from all or some the array's antennas are calculated. Then, the reflected signals are shifted (e.g. back-propagated) using these delays.

The method, according to some embodiments, includes 3 main phases: obtaining and measuring signals reflected and affected from the object and/or the medium surrounding (phase A), hypothesis testing (e.g. measuring) of the measured signals over a given parametric space (phase B) and displaying an accurate image of the target and/or the medium (phase C).

Specifically, phase B includes providing by the processing unit one or more parameters, e.g. hypothetical parameter values, over a parameter space of the object and a target model per hypothesis of the parameter values, and compute a score value per hypothesis as a function of the target model and the affected signals.

With specific reference now to each phase in more details, at step 410 a plurality of RF signals are transmitted towards an object and/or medium for example by a sensing unit comprising an RF antenna array as illustrated in FIG. 3 (e.g. transmit-receive subsystem 304). At step 420 signals reflected and/or affected by the object and/or the medium (received signals) are received by the sensing unit (e.g. receiving antennas) and are recorded for example at the data acquisition subsystem 306. At step 430 the reflected and affected signals (e.g. received signals) are measured for example by the Radio Frequency Signals Measurement Unit (RFSMU) such as a Vector Network Analyzer (VNA).

At step 440 a calibration process is carried out to tune the imaging device so as to maintain coherency of the signals throughout the frequency range, over the entire array, and over all the measurements (e.g. in the case of non-instantaneous measurements). In some cases, the received signals are calibrated for example by the processing unit.

The calibration process is required for example, for each pair of bi-static antennas and for each frequency. The methods and apparatus may be configured to measure the electronic delay and possible mismatch between the antennas and/or the electronics of the array or the device comprising the array, and possible mismatch between the antenna and the medium (object under test).

Examples for embodiments for a calibration process may be found in U.S. patent application Ser. No. 14/499,505, filed on Sep. 30, 2015 entitled "DEVICE AND METHOD FOR CALIBRATING ANTENNA ARRAY SYSTEMS" which application is incorporated by reference herein in its entirety. At step 450 the received signals are converted to time domain for example an Inverse Fast Fourier Transform (IFFT).

It is stressed that the methods described herein using time-domain notation but can be equivalently posed in frequency-domain. Additionally, in some cases only some of the antenna pairs signals are measured, for example less that 90% or 60% signals are measured.

In some cases, the antennas may have a different orientation (polarization). In the case of dual-polarized antennas, each such antenna element is treated as two separate antennas with different polarization.

Stage B of the imaging process, which comprises Hypothesis testing of the target(s) over a given parametric space starts at step 460 which includes scanning a number of space(s) parameters of the one or more target objects or targets type, for example target type, location of the target in 3D space, orientation of the target, size of the target and radius (for a cases the target is for example a pipe or a spherical object).

For each value of the parameters a simulation process is initiated at steps 470-480 which includes target model/simulation per hypothesis of said parameter values. For example the simulation process includes the following steps: At step 470 the time delays per antenna pair of the antenna array are calculated according to the target type (e.g. pipe) provided, as explained in detail below and optionally at step 480 the amplitudes per antenna pair of the antenna array are calculated according to the target type (e.g. pipe model).

At step 490 the received signals (i.e. as measured of phase A) are compared with (or tested against) the target's identified according to the simulation model (of phase B). Specifically, the comparison step comprises summing the received signals of all antenna pairs (or almost all antennas of the antenna array) sampling a calculated time delay and weighted by the calculated amplitudes to obtain a score value per each parameter of the antenna. At the final step of phase B, at step 492 the one or more targets within the medium are identified and measured, and at step 495 the targets may be displayed for example at a user mobile device display, such a smartphone, tablet or headset display.

According to some embodiments of the invention, the image may be displayed according to two alternative methods as presented at steps 493 and 494. At step 493 an image of the target may be constructed based on strength level (score) at each point in space of the target. Specifically the displayed image is a function of the scores of the target-hypotheses result of target that pass though the point. For example in the case of pipe object, in order to construct the image level at point (x,y,z), the scores of all pipe hypotheses of pipes that pass through the point (x,y,z) are combined. For example, if the pipe is parametrized by a 3D point on the pipe r and direction vector P as shown in FIG. 5A, the pipe passes through the point x,y,z if the vector r−(x,y,z) is proportional to P.

Alternatively, as mentioned at step 494 an image of target may be constructed according to a rendered graphical model (e.g. visualization) of N targets including the highest scores, above a threshold based on their parameters.

Figure 5A:
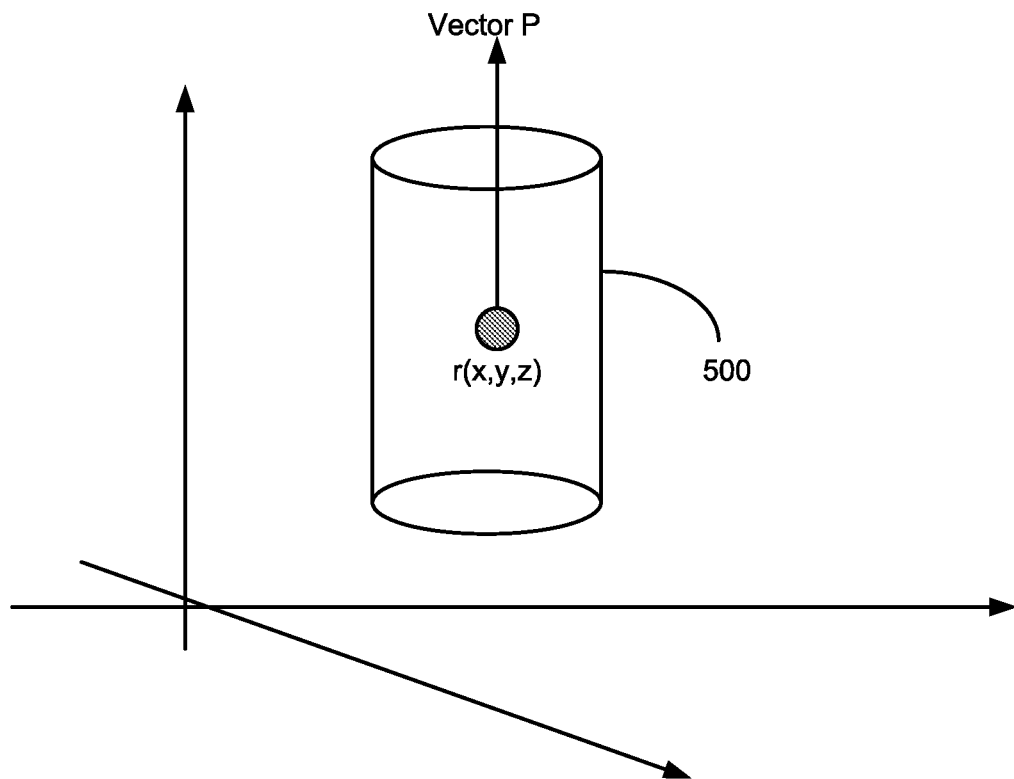
FIGS. 5A and 5B, are simplified diagrams illustrating accordingly a side view and an upper view of a target shaped as an elongated object according to some embodiments of the invention.
Figure 5B:
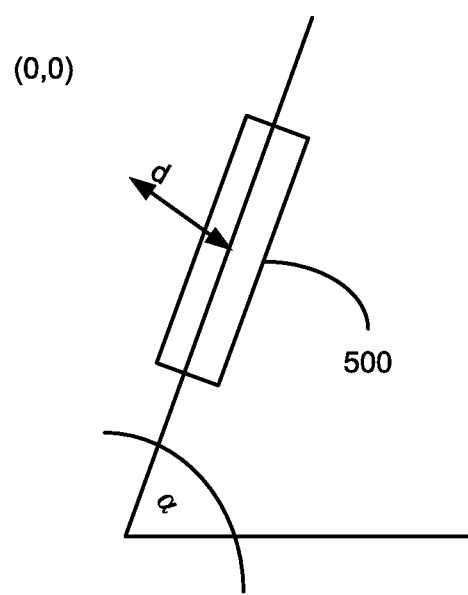

Reference is now made to FIGS. 5A and 5B, which is a simplified diagram is illustrating accordingly a side view and an upper view of a target 500 shaped as an elongated object (e.g. pipe) pipe according to some of the present embodiments. Following below is a more detailed explanation relating to how an accurate imaging of the one or more targets such as pipe 500 placed within the object is constructed based on the received RF signals affected by the medium and the targets or the target's surrounding, in accordance with embodiments of the invention. The imaging process comprises measuring the pipe parameters such as orientation (e) and localization in space r=(x,y,z) as follows:

1. The signals from each transmitting antenna of the antenna array i to each receiving antenna j are recorded, calibrated, and converted to time domain. For example, $y_{ij}(t)$ represents a time-domain signal.
2. At the next step the imaging process proceeds as follows: for each point in space r=(x,y,z) in the relevant arena, a target is hypothetically assumed to pass through the point of space.
3. The hypothetical target's parameters such as orientation (given by a unitary 3D vector P) may be known a-priori (as in the example of searching for vertical rebars), partially knowns (e.g. vertical or horizontal) or unknown. The target's radius R may also be known or unknown.
4. For all antenna pairs (i,j), the overall path delay $T_{ij}$ from the transmit antenna (assumed to be located at $x_i$), to the hypothetical pipe at point r with a given set of parameters denoted as θ (e.g. orientation P) and back to the receiving antenna ($x_j$) is calculated using a the ray model described below. As opposed to standard reflection models, this model defines a different reflection point $p_{ij}$ for each antenna pair.
5. The reflection's amplitude $A_{ij}$ may be calculated as well, considering the TX/RX antenna radiation pattern in the direction of the point $p_{ij}$, the path lengths from each antenna to this point (affecting space loss and dielectric attenuation), the reflection angles and polarization (in the case of a dielectric pipe) and the antennas polarization with respect to the target. It should be stressed, that if the phase of the radiated wave has angular dependence, the antenna radiation pattern may also be used in order to correct the delay $T_{ij}$.
6. If the orientation and/or radius are unknown, then this calculation may be performed for several values of these parameters.
7. The score at point r in space and for value θ of the other unknown parameters (e.g. orientation) is calculated as:

$$\text{Score}(r,\theta) = \Sigma w_{ij} \cdot y_{ij}(T_{ij})$$

8. The weights $w_{ij}$ may be set to 1. For considering signal amplitudes the weights may be chosen as $$w_{ij} = \frac{A^*_{ij}}{|A_{ij}|^2 + \sigma^2_{ij}}$$

where $\sigma_{ij}^2$ is an estimate of the noise and clutter that exists on the relevant signal. It is stressed that this weight is also dependent upon the polarity of the reflection.

9. In the case of pipes, due to the ray model defined below and symmetry considerations, $T_{ij}$ and hence the score is only a function of the projection of r to a subspace orthogonal to the pipe orientation P, the image (for given orientation P) is constant along the direction P. Therefore, it is sufficient to calculate the score on a 2D plane, and then expand it by repeating the same values along lines parallel to the pipe orientation. Alternatively, the pipe can be defined by other parameters (instead of point in space r and orientation), for example, by combining depth (z), distance from the z axis ($d=\sqrt{x^2+y^2}$) and rotation angle θ describing the orientation P=(cos θ, sin θ, 0)

10. Once the target (e.g.) parameters are computed, a 3D image may be produced by displaying the score for each point in space. When multiple hypotheses on the parameters θ (e.g. radius R and pipe orientation P) exist, the score is produced for each value of the hypothesis θ and may be combined to produce an image by several ways, such as taking the maximum score per point or per region (i.e. a subset of the geometrical space), picking (locally or globally) the scores with maximum contrast, etc.

11. Specifically, in the case of a single target, the method comprises, selecting a single hypothesis (r,θ) for which the score is maximal. This can be seen as a particular case of combining multiple hypothesis as explained above at step 10, using a single 'region'.

12. Additionally, multiple target types may be searched according to the method illustrated in previous step and FIG. 4, by extending the parameter space to include a target type (an additional parameter) and parameters describing each type of target, as explained in more detail below Two particular cases of the procedure described above are (a) imaging a target with known parameters (θ) and unknown location r by scanning multiple hypotheses on location and (b) (a) imaging a target with unknown parameters (θ) and known or partially location r by scanning multiple hypotheses of the parameters.

For measuring the target's radius, a person of ordinary skill in the art will recognize variations and adaptations that may be made to measure the target's parameters, including, but not limited to measuring the target's radius. For example the target's radius may also be found according to a variation of algorithms as described in the prior art literature by. Xian-Qi He, Zi-Qiang Zhu, Qun-Yi Liu, and Guang-Yin Lu, "Review of GPR Rebar Detection,", PIERS Proceedings, Beijing, China, Mar. 23-27, 2009. or other algorithms described herein below, which are incorporated herein by reference. The measured parameters such as the target's radius may added to the imaging algorithm as described above.

Ray Model

According to some embodiments of the invention, to facilitate the computation of step 4 described above (i.e. Stage B: Hypothesis testing over a given parametric space as shown in FIG. 4), there is provided a method for finding and calculating the reflection point from a target shaped for example as an elongated object (e.g. pipe) the reflection point on the pipe $p_{ij}$ and the delay $T_{ij}$ for a given antenna pair. Since a pipe acts like a mirror in one direction, and as a result the reflection point is the point where the angles of the incoming and outgoing rays with the pipe axis are equal.

Figure 6A:
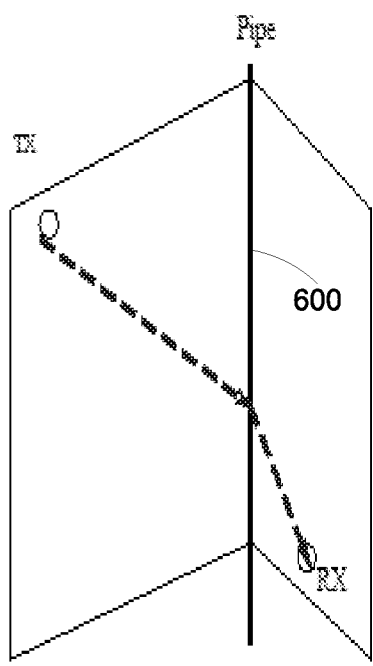
FIGS. 6A-6B are schematic view of a pipe, in accordance with embodiments of the invention.
Figure 6B:
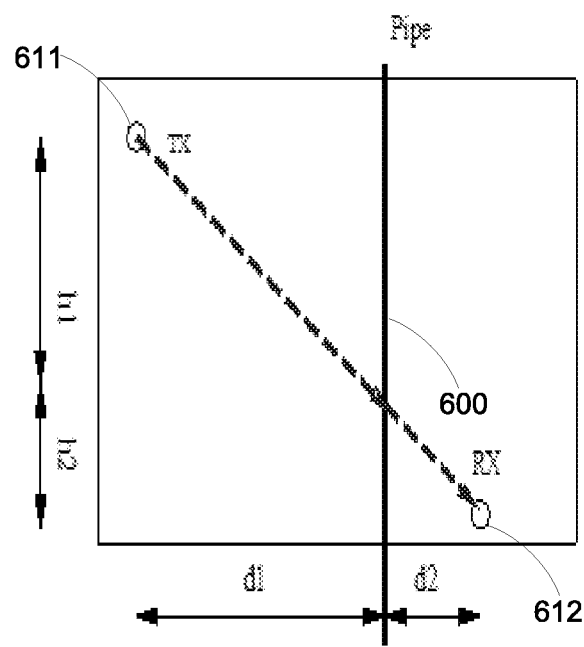

As illustrated in Error! Reference source not found., for a target object e.g. pipe 600 with zero radius, the point of reflection may be computed by mirroring one of the antennas of an antenna array 610 to the other side of the pipe, and taking a straight line. In other words, denoting by $d_i$ the (minimum) distance of the pipe from each of the antennas 611 and by $h_{ij}$ the total distance between the antennas along the pipe axis (i.e. $h_{ij}=|(x_i-x_j)\cdot P|$), the point $p_{ij}$ is calculated by passing a straight line in a plane, between two points in distances $d_i,d_j$ from the pipe and height difference h as illustrated in FIG. 6b. The result is that the location along the pipe axis is $$h \cdot \frac{d_i}{d_i + d_j}$$

for antenna i and vice versa for antenna j.

The time of arrival $T_{ij}$ can then be calculated using the following path length Eq.

$$T_{ij}=v^{-1}\|x_i-p_{ij}\|+v^{-1}\|x_j-p_{ij}\| \qquad (1)$$

where v is the propagation velocity and $\|\cdot\|$ is the L2 norm (Euclidian vector length).

When the pipe's radius is non-zero, the radius is first reduced from $d_1$, $d_2$ before making the calculations above.

In some embodiments, where the point $p_{ij}$ itself is of no interest, the time of arrival $T_{ij}$ can be directly calculated by taking the overall distance in the spanned 2D plane (as shown in right side of Error! Reference source not found.) using Pythagoras' law:

$$T_{ij}=v^{-1}\sqrt{h^2+(d_i+d_j)^2}$$

In a general scenario where propagation to the pipe may not be in straight lines (as an example in layered or non-homogenous media), the modelling (e.g. 3D imaging) of the pipe is performed by finding a point on the pipe where by the said propagation model, the angle of arrival and the angle of departure (with respect to the pipe axis) are equal, and computing the delay and amplitude with respect to this point.

It is stressed that the same imaging procedure may be used where the amplitude and time-of-arrival are computed via full or partial EM (electromagnetic) simulation, instead of the model described.

When polarimetric information is present, i.e. some antennas have different polarizations, then the identification of the pipe's orientation is accomplished by both finding the orientation where the delays $T_{ij}$ match with the signals (maximum of $I_{DAS}$) and by the fact that amplitudes $A_i$ match the expected amplitudes (and are maximized in the correct polarization). This property is embedded in the algorithm described above.

According to other embodiments of the invention the hypothesis testing method for identifying and measuring a target may include alternative measuring procedures. Generally the procedure is similar to the flow described hereinabove in respect to FIG. 4. The model is calculated for the hypothesis of a target at each point in space (and potentially radius, orientation). The result of the calculation is an expected received signal for each antenna pair for the given target hypothesis. At the following step, the model is compared to the received signal (per point), where the comparison may be via matched filtering (taking the sum over pairs and time lags of the model prediction times the signals) such as Capon beamforming, or other methods as known to those skilled in the art. This comparison can be equivalently posed in frequency domain.

As mentioned, multiple target types may be searched by the method described herein. For example the imaged scene may include point of targets, pipes or wires and layers or mirrors or surfaces.

For each target type, a parameter space is scanned suitable for the target, at the next step the respective delays and amplitudes are calculated, and the signals are combined. The score value per hypothesis on the target type and its parameters obtain are obtained an as described above in reference to FIG. 4.

An exemplary parameter space for 3 target types may comprise:

Pipe: 3 parameters: depth, distance from center (0,0), orientation.
Layer (along XY plane): depth (1 parameter)
Point target: X,Y,Z (3 parameters).

Following a scan of all hypothesis an image may be obtained in accordance with embodiments of the invention. In some cases, a 3D image is displayed based on the score in each point in space which represents the maximum score associated with any target (from the scanned target types) that passes through the point.

In some cases, a number of targets are selected to identify and display (N), and the strongest N (for example N=1, or N=2) hypotheses are identified, and provided as the score associated with that hypothesis passes a threshold, the displayed image is rendered with a computerized graphical model matching the detected parameters (i.e. the parameters relating to the hypothesis/hypotheses that passed a threshold). For example, in the case of a pipe, a line can be drawn on the screen with the respective orientation.

In some embodiments, the parameters of the target that yield the best score may be calculated without full scanning of the parameter space. For example, an alternative procedure is to first find for each signal $y_{ij}(t)$ the delay $t_{ij}$ yielding the maximum value (e.g. $t_{ij}=\text{argmax}(|y_{ij}(t)|)$), and then finding the value of the parameters such that $T_{ij}$ best fit to $t_{ij}$ (for all i, j). The last step may be performed by iterative solutions to non-linear least-squares problem as known to those of skill in the art. In some embodiments, the scanning process previously described may be combined with the calculation described herein. For example, the parameter space is scanned over a rough grid to find a hypothesis r,θ that approximately fits the signals y. Then, the delays $t_{ij}$ are estimated from the signals by considering the maximum in a region of ±Δ around the times predicted by the model resulting from the hypothesis found $t_{ij}=\text{argmax}_{t\in[T_{ij}(r,\theta)\pm\Delta]}(|y_{ij}(t)|)$, and then the process continues as described above.

Imaging Pipes or Other Geometrical Targets Via Image Post-Processing

According to another embodiment of the invention, the 'hypothesis testing' stage for measuring and imaging the one or more targets may alternatively be performed as follows:

1. Perform imaging using methods assuming point-targets (e.g. delay-and-sum). The image is a signed value (e.g. positive or negative per each point) of the estimated reflection from each point in space which is produced without considering the target shape or parameters.
2. Sum the relevant signed image values along the hypothesized trajectory of the target (e.g. the pipe) for various target directions.
3. Select the pipe trajectories with maximum absolute sum. In some embodiments, a counter-balance taking into account the size of the region is added, as an example, the sum can be normalized by a function of the overall length.

This method may be applied when the objects are not necessarily straight. Additionally the method may be applied to settings combining point targets, pipe segments, bent pipes, surfaces and so on. The identification of the pipe's trajectory may be obtained via a greedy algorithm, where each time attempting to extend the pipe along the direction that will yield the maximum sum. In order to find targets other than pipes (for example surfaces), the method as described herein is repeated, i.e. an image produced under assumption of point target, is integrated over the range of space representing the target in order to produce a score for a target.

Imaging and Finding Pipe Orientation Using Polarimetric Information

According to another embodiment of the invention, as illustrated in FIG. 7 the 'hypothesis testing' stage for measuring and imaging the one or more targets may alternatively be performed as follows:

For objects whose diameter is smaller than the typical wavelength, a difference in reflection power would exist between the waves having a polarization parallel and perpendicular to the object.

In some embodiments, there isn't any need to find the shape of the target but instead, optimally combine the horizontal and vertical polarization without a-priori knowing the target's (e.g. pipe's orientation), and learn the pipe's orientation from the polarization per imaged point. Therefore, according to another embodiments of the present invention there is provided method for imaging an object, such as elongated object comprising:

1. Generating at least three images, representing the HH,VV and HV reflections from the target. (where the terms XX,YY and XY, will be defined herein below).
2. Combining the images using one of the metrics specified below.
3. Optionally, computing for each point, the orientation of the pipe, as explained below in step 730.

Figure 7A:
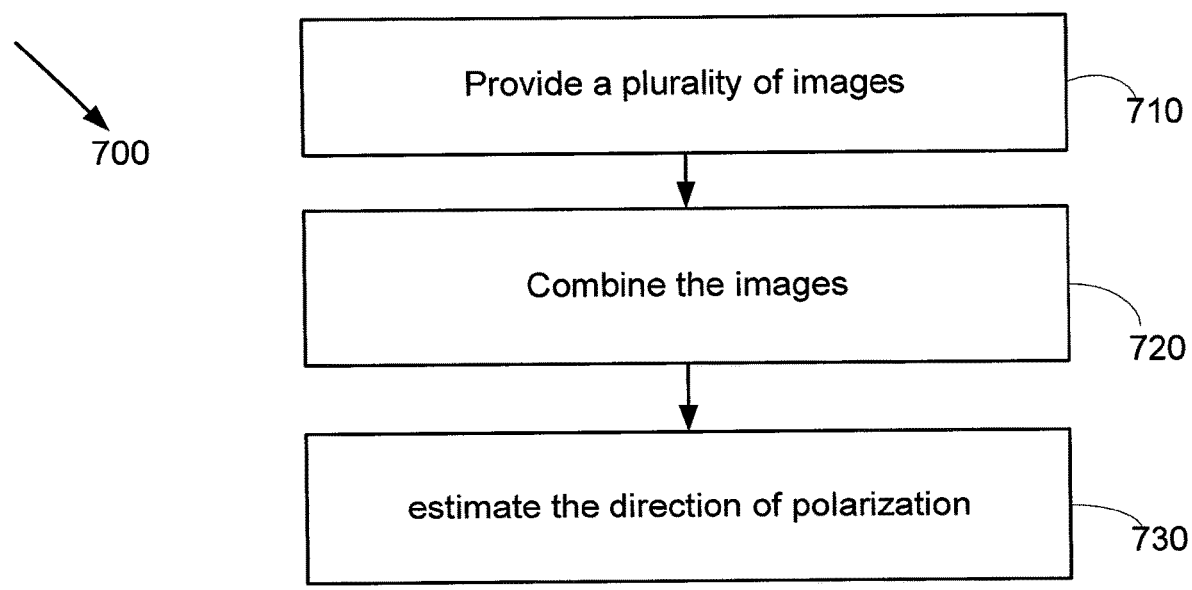
FIG. 7A is flowchart illustrating alternative methods of hypothesis testing in accordance with embodiments of the invention.
Figure 7B:
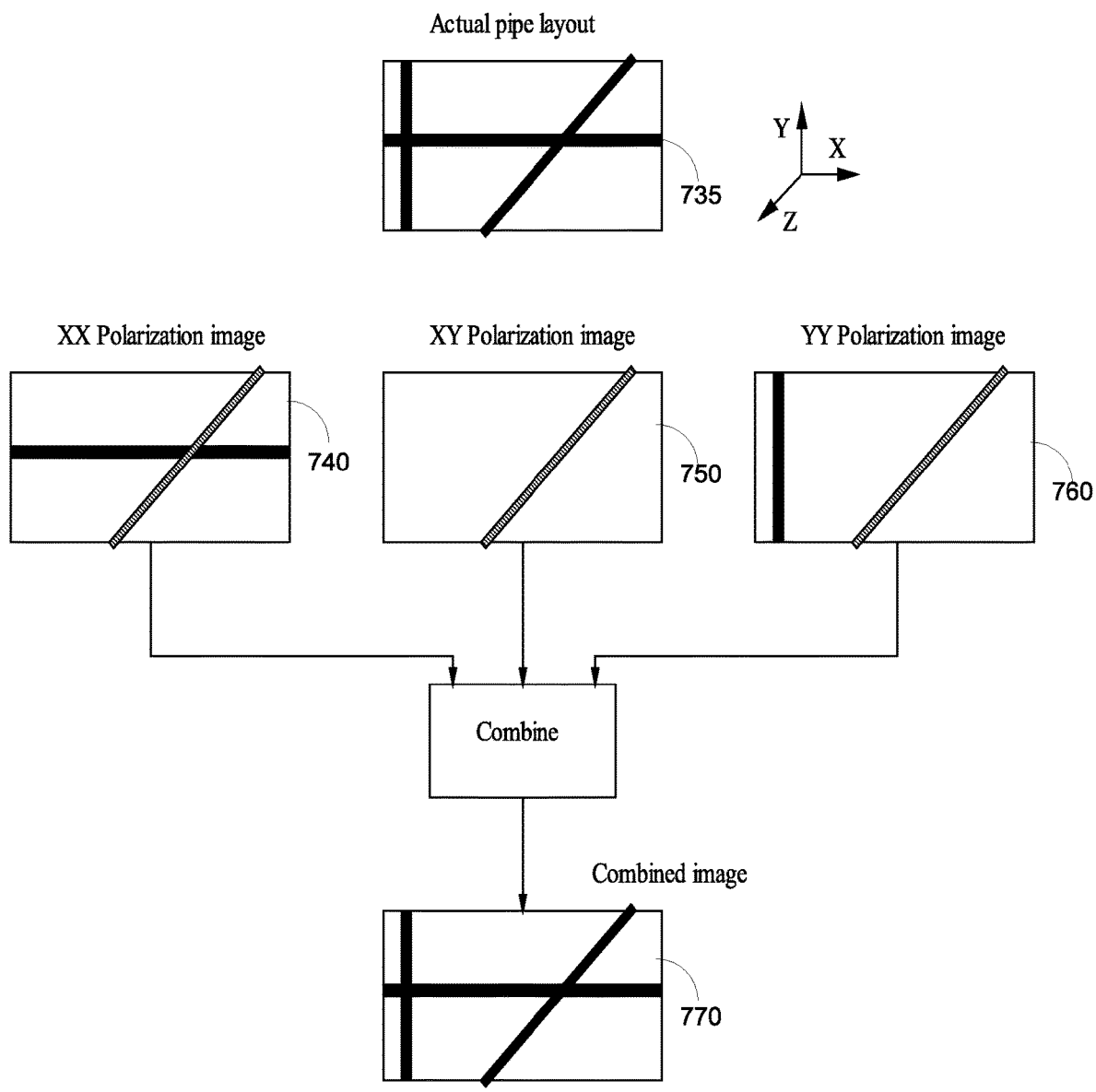
FIG. 7B is a flowchart illustrating three polarization images of a pipe combined to a single image, in accordance with embodiments of the invention.

Reference is now made to FIGS. 7A and 7B illustrating a flow chart 700 and three exemplary polarization images of an imaged object such as a pipe embedded in a medium such as a wall. Specifically, following below is a more detailed explanation relating to how an accurate imaging of the one or more objects such as pipe 500 embedded within the medium is constructed based on the received RF signals affected by the object and the targets or the target surrounding, in accordance with embodiments of the invention.

Step 710: to produce the three images, each point in space is regarded as a perfect polarizer. First, it is assumed to be a perfect polarizer in X axis i.e. it is modelled as a target removing all field components in Y,Z axes. As shown in FIG. 7B, image 740 is a XX axes polarization image, image 750 is XY axis polarization image and image 760 is an YY image polarization of image of an actual pipe layout 735 embadded for example in a wall. The signed signal amplitudes from each transmitter/receiver pair to the point of interest r are computed under this assumption (e.g. by using a far field model). The image is produced by summing all signals coherently, where the amplitudes are affected by the polarization assumption, e.g. using the following Eq (2):

$$I(r) = \sum \frac{A_{ij}}{|A_{ij}|^2 + \sigma_{ij}^2} \cdot y_{ij}(T_{ij}) \qquad (2)$$

According to the notation previously defined.

When $A_{ij}$ are computed using the X polarization assumption the image will be termed $I_{xx}(r)$ (the dependence on r is omitted in the following). The process is repeated where now the target is assumed to be a perfect polarizer in Y axis, producing the image $I_{yy}(r)$. Lastly, the target is assumed to be a "cross polarizer" turning any E field in the X direction into a field in the Y direction, and vice versa, producing the image $I_{xy}$.

In the case of dual-polarized antennas (as illustrated in Error! Reference source not found.B), under the far-field assumption, and for targets that are approximately at the bore-sight of the array, the polarimetric images can be generated in a simplified approximate form, by generating/ from all the X-polarized antennas, $I_{yy}$ from all the Y-polarized antennas and $I_{xy}$ from all the cross polarized antenna pairs.

Step 720: Combine the 3 images. As shown in FIG. 7B the 3 images 740, 750 and 760 are combined to an image 770 presenting a visualization of the pipe parameters such as size orientation and etc. The standard way to combine these images, when the target is non-polarizing, or the polarization is not known, is the optimal linear combiner (HH+VV):

$$\hat{I}_{linear} = I_{xx} + I_{yy}$$

However an improved image using the cross-polarized measurements can be obtained using one of the following metrics, depending on the case:

$$\hat{I}_{JML} = \text{sign}(I_{xx} + I_{yy}) \cdot \frac{1}{4}\{|I_{xx} + I_{yy}| + |(I_{xx} - I_{yy}) + j(I_{xy} + I_{yx})|\}$$

$$I_{LLR} = \log(J_0(j \cdot c_{S/C} \cdot |(I_{xx} - I_{yy}) + j(I_{xy} + I_{yx})|)) + c_{S/C}(I_{xx} + I_{yy})$$

$$I_{Quad} = (I_{xx} + I_{yy})^2 + \frac{1}{2}(I_{xx} - I_{yy})^2 + \frac{1}{2}(I_{xy} + I_{yx})^2$$

$$I_{axis} = \max(|I_{xx}|, |I_{yy}|)$$

Where $J_0$ is the Bessel-J function and $c_{S/C}$ is a constant representing the signal to noise and clutter. $I_{yx} = I_{xy}$. $\hat{I}_{JML}$ reflects the optimal image level obtained when the fields are aligned the best polarization (indicated by $\hat{\theta}_{JML}$ below). $I_{LLR}$ is an alternative combiner based on the likelihood-ratio which is utilized when the signal-to-clutter or signal-to-noise are low. $I_{Quad}$ is a quadratic combiner which is simpler to compute numerically, and $I_{axis}$ is optimized for the assumption that most pipes are aligned with either the X or the Y axis (as common in in-wall imaging) and favors these pipes.

Step 730: estimate the direction of polarization using the following Eq:

$$\hat{\theta}_{JML} = \frac{1}{2} \cdot \text{angle}\{((I_{xx} - I_{yy}) + j(I_{xy} + I_{yx})) \cdot (I_{xx} + I_{yy})\}$$

Estimation of the Radius of Pipes

In accordance with some embodiments of the invention there is provided a method for imaging one or more targets according to various hypothetic values of a radius R of a target.

In some cases the method for estimating radius such as pipe's radius (e.g. sub-wavelength radius) comprises using the different delays exhibited by the two polarizations. In other words, the pipe behaves like a dipole in the orthogonal polarization and like an infinite wire in the other. This results in a difference in amplitude as well as delay (as a function of the wavelength and radius).

Figure 8:
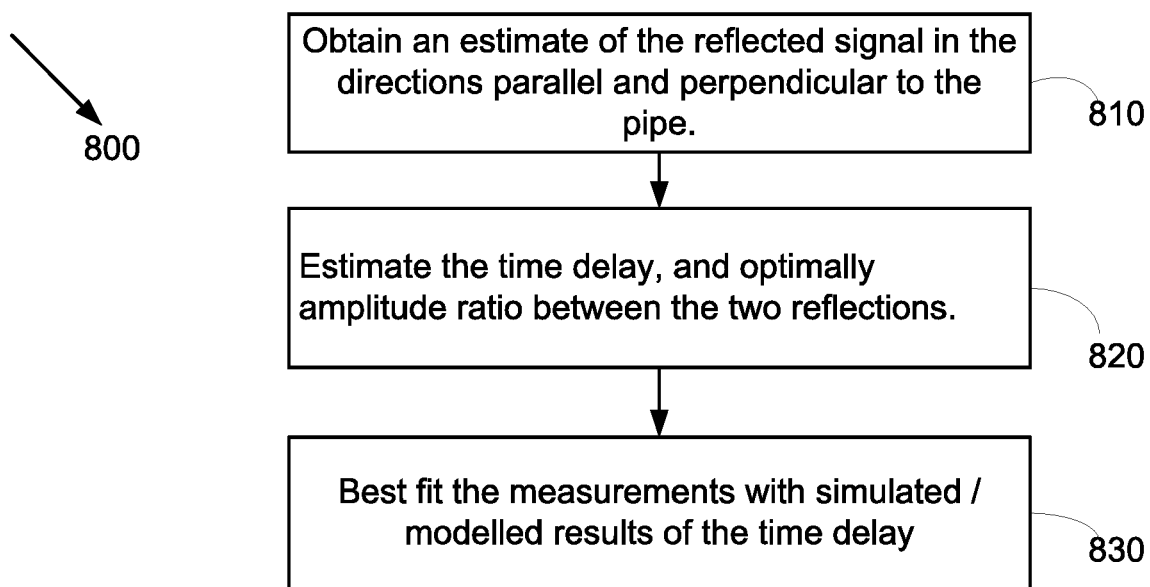
FIG. 8 are flowchart illustrating alternative methods of hypothesis testing in accordance with embodiments of the invention.

FIG. 8 shows a flowchart of a method 800 for estimating a radius of a target such as a pipe in accordance with embodiments of the invention.

1. Obtain an estimate of the reflected signal in the directions parallel and perpendicular to the pipe (step 810).
2. Estimate the time delay, and optimally amplitude ratio between the two reflections (step 820).
3. Selecting a best fit the measurements with simulated/ modelled results of the time delay (step 830).

These steps of FIG. 8 are describe in details hereinbelow:

Obtain an estimate of the reflected signal in the directions parallel and perpendicular to the pipe. This step is performed by summing all signals from the antennas polarized in the relevant direction (parallel, perpendicular), after back-propagating the different time delays $T_{ij}$, i.e. $\Sigma y_{ij}(t-T_{ij})$, where the sum is a partial sum over some of the signals.

If the pipe's orientation is not known, or is not aligned with the antennas, then the orientation angle θ can first be estimated using the method described above. Then, the polarization parallel and perpendicular to the pipe is extracted using:

$$y_\| = y_{xx} \cos^2\theta + y_{yy} \sin^2\theta + (y_{xy} + y_{yx})\sin\theta \cos\theta$$

$$y_\perp = y_{xx} \sin^2\theta + y_{yy} \cos^2\theta - (y_{xy} + y_{yx})\sin\theta \cos\theta$$

Where $y_{xx}, y_{yy}, y_{xy}$ are the signals measured at each antenna polarization separately.

Figure 9A:
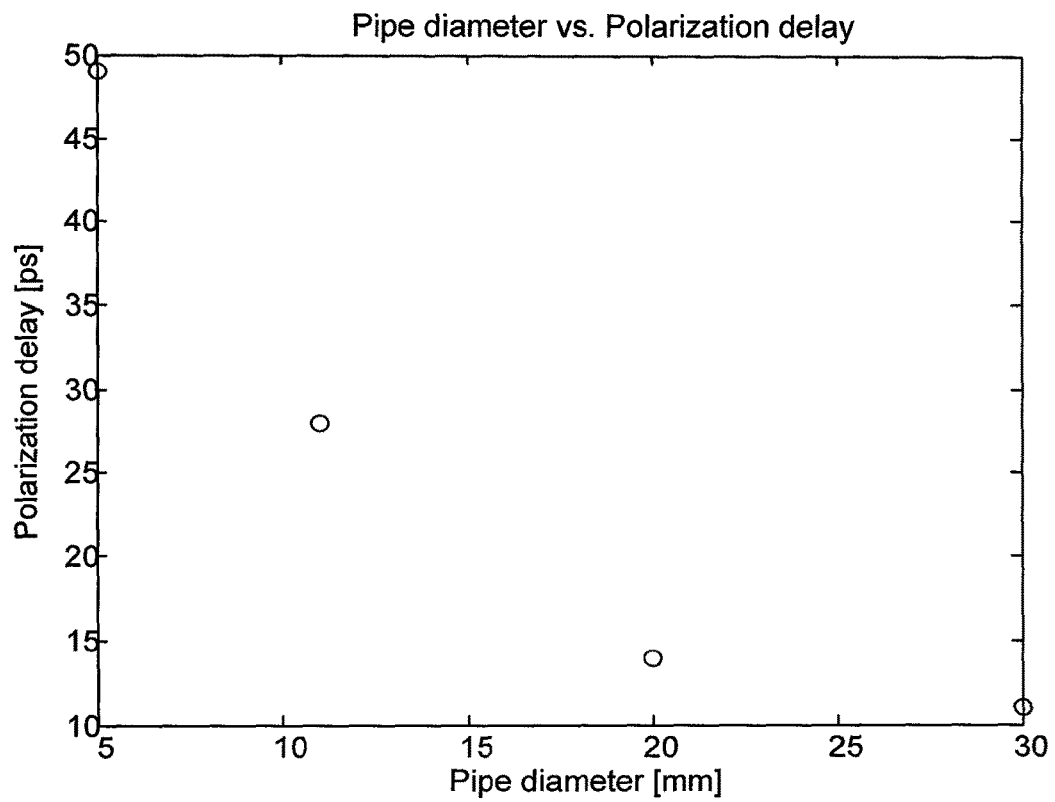
FIG. 9 is a diagram of FDTD simulation results, polarimetric delay and ratio in air vs. pipe diameter, according to an embodiment of the invention.
Figure 9B:
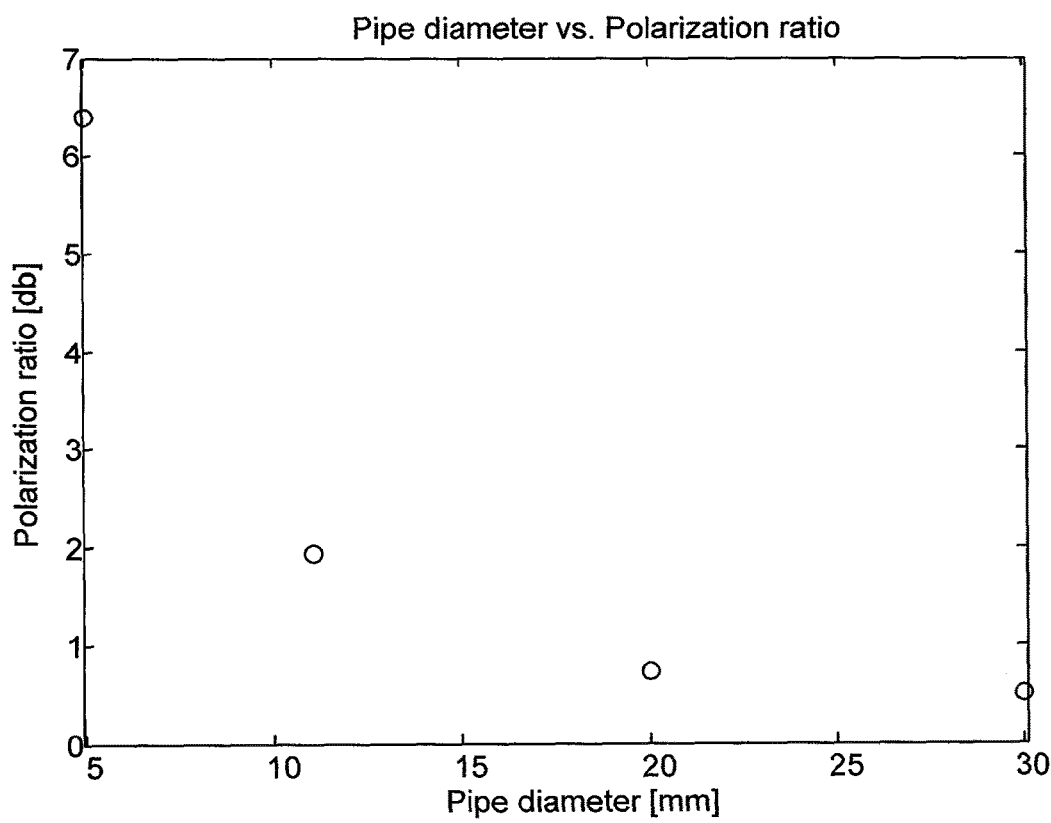

FIG. 9A-9B illustrate exemplary FDTD simulation results of a polarimetric delay and ratio in air vs. pipe diameter, in accordance with embodiments of the present invention.

For providing further details of how to autofocus an image which enable estimating the radius of a target, by way of illustration only, the following applications are incorporated herein by reference in their entirety: U.S. provisional application Ser. No. 62/152,928 entitled "System Devise and Method for Estimating Dielectric Media Parameters".

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platfoim. Other development environments are available without cost including, by way of non-limiting examples, Lazarus, MobiFlex, MoSync, and Phonegap. Also, mobile device manufacturers distribute software developer kits including, by way of non-limiting examples, Phone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

1. Pena, D.; Feick, R.; Hristov, H. D.; Grote, W., "Measurement and modeling of propagation losses in brick and concrete walls for the 900-MHz band,", IEEE Transactions on Antennas and Propagation, Volume: 51, Issue: 1, 2003). Link: [Pena 2003]
2. Roqueta, G.; Jofre, L.; Feng, M. Q, "Analysis of the Electromagnetic Signature of Reinforced Concrete Structures for Nondestructive Evaluation of Corrosion Damage," IEEE Transactions on Instrumentation and Measurement, Volume: 61, Issue: 4, 2012). Link: [Roqueta 2012]
3. Xian-Qi He, Zi-Qiang Zhu, Qun-Yi Liu, and Guang-Yin Lu, "Review of GPR Rebar Detection,", PIERS Proceedings, Beijing, China, Mar. 23-27, 2009. Link: [Xian Qi 2009]
4. Stoke, C. and K. Nick, "Eccentricity-migration: A method to improve the imaging of pipes in radar reflection data," Fifth International Conference on Ground Penetrating Radar, Expanded Abstracts, Proceedings, Ontario, Canada, 723-733, 1994. Link: [Stolte 1994]
5. Jan van der Kruk, "Three dimensional imaging of multi-component ground penetrating radar data" (Phd dissertation) (see also Streich, R and J. van der Kruk, "Accurate imaging of multicomponent GPR data based on exact radiation patterns," IEEE Transactions on Geoscience and Remote Sensing, Vol. 45, 93-103, 2007). Link: [Jan van der Kruk 2001].

What is claimed is:
1. A Radio Frequency (RF) device, the device comprising:
an array, the array comprises at least two transducers, wherein at least one of said at least two transducers is configured to transmit a signal towards at least one object embedded in a medium, and at least one transceiver attached to said at least two transducers, the at least one transceiver is configured to transmit at least one RF signal toward the at least one object and receive a plurality of RF signals affected by the object while the array is moved in proximity to the medium;
a data acquisition unit configured to receive and store said plurality of affected RF signals; and
at least one processor unit, said at least one processor unit is configured and operable to:
provide one or more hypothetical parameter values over a parameter space of said at least one object;
provide a target model per hypothesis of said parameter values, and compute a score value per hypothesis as a function of the target model and the plurality of affected RF signals;
generate at least two or three images, representing reflections of said plurality of affected RF signals depending on combinations of different polarizations;
combine the at least two or three images to provide an image of said at least one object; and
compute the direction of said at least one object based on said at least two or three images and wherein the at least two or three images are denoted as $I_{xx}$, $I_{yy}$, $I_{xy}$ and are combined using one of the following metrics:

$$I_1 = \text{sign}(I_{xx} + I_{yy}) \cdot \frac{1}{4}\{|I_{xx} + I_{yy}| + |(I_{xx} - I_{yy}) + j(I_{xy} + I_{yx})|\}$$

$$I_2 = \log(J_0(j \cdot c_{S/C} \cdot |(I_{xx} - I_{yy}) + j(I_{xy} + I_{yx})|)) + c_{S/C}(I_{xx} + I_{yy})$$

$$I_3 = (I_{xx} + I_{yy})^2 + \frac{1}{2}(I_{xx} - I_{yy})^2 + \frac{1}{2}(I_{xy} + I_{yx})^2$$

$$I_4 = \max(|I_{xx}|, |I_{yy}|)$$

where $J_0$ is the Bessel-J function, $j=\sqrt{1}$, $c_{S/C}$ is a constant and $I_{yx}=I_{xy}$.

2. The device of claim 1, wherein said score value is processed by said at least one processing unit to provide said image of said at least one object.

3. The device of claim 2, wherein said image comprises an image of a portion of said at least one object, said portion is located in proximity to the device or the array.

4. The device of claim 2, wherein said image comprises an image of a portion of said at least one object, said portion is located in front of the device or the array in parallel or perpendicular to the device or the array.

5. The device of claim 2, wherein said image is a 2D (two dimensional) or 3D (there dimensional) image.

6. The device of claim 1, wherein said parameter space comprises one or more parameters selected from the group consisting of:
depth, distance from a reference point, orientation, radius, location point (X, Y, Z) in a X-, Y-, Z-axis Cartesian coordinate system, dielectric constant.

7. The device of claim 1, wherein the at least one object shape is selected from the group consisting of an elongated object, a plane layer, a single point.

8. The device of claim 7, wherein the elongated object is one or more of a pipe, rebar or wire.

9. The device of claim 1, wherein the at least one object or the medium are made of one or more of: plaster, stone, concrete, gypsum, iron, plastic wood, glass, plastic, gypsum, aluminum iron, stone, air, or combinations thereof.

10. The device of claim 2, wherein the device is configured to be in communication with a mobile device comprising a processor and wireless communication circuitry to couple to the device, the processor comprising instructions to receive data on said at least one object and display the image of said at least one object on a display.

11. The device of claim 10, wherein said at least one processor unit and said display are located in said mobile device.

12. The device of claim 1, wherein said target model consists of a plurality of delays of transducers pairs of the at least two transducers of said array.

13. The device of claim 12, wherein said target model consists of a plurality of amplitudes of transducers pairs of the at least two transducers of said array.

14. The device of claim 1 wherein said processing unit is configured to:
compute a signaled value of an estimated reflection from each point in space in an area of said at least one object;
sum signed images along a hypothesized trajectory of the at least one object for one or more of said at least one object directions; and select the at least one object trajectories with maximum absolute sum.

15. The device of claim 14, wherein the sum is normalized by a function of the overall length of the at least one object.

16. The device of claim 8, wherein said processing unit is configured to measure said pipe radius, said estimation comprises:
    obtaining an estimate of the affected signals in one or more directions parallel and perpendicular to the pipe;
    computing the time delay or amplitude ratio between at least two reflections of said reflections; and
    selecting a best fit of the measurements with simulated/modelled results of the time delay.

17. The device of claim 2, wherein the image is constructed according to a strength level at each point in space of said at least one object.

18. The device of claim 2, wherein the image is constructed according to a rendered graphical model of said at least one object, said rendered graphical model comprising the highest scores, above a threshold.

19. A Radio Frequency (RF) device, the device comprising:
    an array, the array comprises at least two transducers, wherein at least one of said at least two transducers is configured to transmit a signal towards at least one object embedded in a medium, and at least one transceiver attached to said at least two transducers, the at least one transceiver is configured to transmit at least one RF signal toward the at least one object and receive a plurality of RF signals affected by the object while the array is moved in proximity to the medium;
    a data acquisition unit configured to receive and store said plurality of affected RF signals; and
    at least one processor unit, said at least one processor unit is configured and operable to:
        provide one or more hypothetical parameter values over a parameter space of said at least one object;
        provide a target model per hypothesis of said parameter values, and compute a score value per hypothesis as a function of the target model and the plurality of affected RF signals;
        generate at least two or three images, representing reflections of said plurality of affected RF signals depending on combinations of different polarizations;
        combine the at least two or three images to provide an image of said at least one object; and
        compute the direction of said at least one object based on said at least two or three images and wherein the direction and polarization of said at least one object is based on said at least two images and is computed according to the following equation:

$$\hat{\theta} = \frac{1}{2} \cdot \text{angle}\{((I_{xx} - I_{yy}) + j(I_{xy} + I_{yx})) \cdot (I_{xx} + I_{yy})\}$$

* * * * *